(12) United States Patent
Munakata et al.

(10) Patent No.: US 11,262,857 B2
(45) Date of Patent: Mar. 1, 2022

(54) RENDERING DEVICE AND RENDERING METHOD

(71) Applicant: Wacom Co., Ltd., Saitama (JP)

(72) Inventors: Hiroshi Munakata, Saitama (JP);
Hiroshi Tamano, Saitama (JP);
Yuanhao Chen, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/879,414

(22) Filed: May 20, 2020

(65) Prior Publication Data
US 2020/0278763 A1  Sep. 3, 2020

Related U.S. Application Data

(63) Continuation of application No. PCT/JP2018/040918, filed on Nov. 2, 2018.

(30) Foreign Application Priority Data

Nov. 21, 2017 (JP) .............................. JP2017-223497

(51) Int. Cl.
*G06F 3/041* (2006.01)
*G06T 19/00* (2011.01)
*G06F 3/0354* (2013.01)

(52) U.S. Cl.
CPC ........ *G06F 3/03545* (2013.01); *G06F 3/0414* (2013.01); *G06T 19/00* (2013.01); *G06T 2200/24* (2013.01)

(58) Field of Classification Search
None
See application file for complete search history.

(56) References Cited

U.S. PATENT DOCUMENTS 9,812,096 B2 * 11/2017 Deering .................... G06T 3/40
10,536,691 B2 * 1/2020 Valdivia .................. G06F 3/013
(Continued)

FOREIGN PATENT DOCUMENTS

| JP | 9-305306 A | 11/1997 |
| JP | 2012-064010 A | 3/2012 |
| JP | 2013-084096 A | 5/2013 |

OTHER PUBLICATIONS

Screen captures from YouTube video clip entitled, "Tilt Brush: Painting from a new perspective," 2 pages, uploaded on May 3, 2016, by user "Google". Retrieved from Internet: <https://www.youtube.com/watch?v=TckqNdrdbgk>.
(Continued)

*Primary Examiner* — Duane N Taylor, Jr.
(74) *Attorney, Agent, or Firm* — Seed IP Law Group LLP

(57) ABSTRACT

A rendering device that renders a three-dimensional object displayed in a virtual reality space on a display includes a processor and a memory storing instructions that, when executed by the processor, cause the processor to render the 3D object as a 3D object of 3D displaying in a virtual reality space coordinate system, render the 3D object as a 3D object of 2D displaying in a plane coordinate system, and update displaying of the display based on a result of the 3D object being rendered as the 3D object of 3D displaying in the virtual reality space coordinate system and a result of the object being rendered as the 3D object of 2D displaying in the plane coordinate system. The rendering device enables intuitive drawing with high accuracy in the virtual reality space.

20 Claims, 8 Drawing Sheets

(56) References Cited

U.S. PATENT DOCUMENTS

| | | |
|---|---|---|
| 2012/0072866 A1 | 3/2012 | Imai et al. |
| 2015/0016777 A1* | 1/2015 | Abovitz ............. G02B 27/0172 |
| | | 385/37 |
| 2015/0242575 A1* | 8/2015 | Abovitz ............... G01B 11/303 |
| | | 705/2 |
| 2016/0343174 A1 | 11/2016 | Fuentes et al. |
| 2019/0347865 A1* | 11/2019 | Hackett ............... G06F 3/03545 |

OTHER PUBLICATIONS

International Search Report and Written Opinion, dated Feb. 5, 2019, for International Application No. PCT/JP2018/040918, 4 pages, (w/ English machine translation of International Search Report).

Extended European Search Report, dated Apr. 1, 2021, for European Application No. 18882151.6-1216, 6 pages.

* cited by examiner

F I G . 7
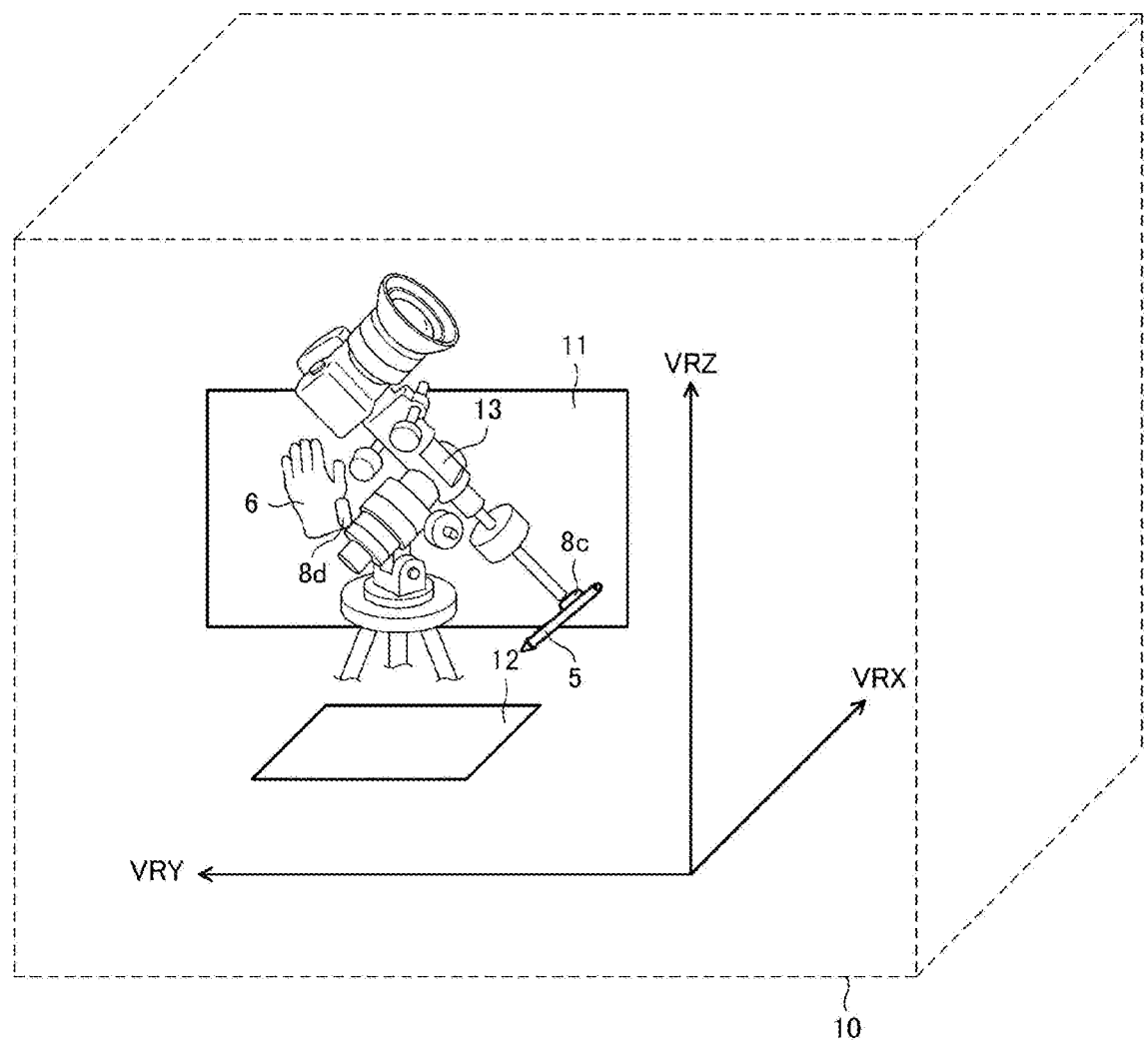

RENDERING DEVICE AND RENDERING METHOD

BACKGROUND

Technical Field

The present disclosure relates to a rendering device that carries out rendering of a 3D (Three-Dimensional) object in a virtual reality (including VR: Virtual Reality, AR: Augmented Reality, MR: Mixed Reality) space and a rendering method.

Background Art

In recent years, needs to design various products while carrying out stereoscopic viewing in a virtual reality space have been increasing.

Patent Document 1 discloses a technique in which a 3D object is generated based on a 2D (Two-Dimensional) object input to a tablet terminal by using an electronic pen in an AR space. Hereinafter, the method of input carried out by moving an electronic pen on a plane will be referred to as "2D input."

Non Patent Document 1 discloses a technique in which a 3D object is input by moving a controller for 3D input in a VR space. However, the method of input with use of such a controller for 3D input will be referred to as "3D input."

PRIOR ART DOCUMENT

Patent Document

Patent Document 1: U.S. Patent Application Publication No. 2016/0343174

Non Patent Document

Non Patent Document 1: Google, "Tilt Brush: Painting from a new perspective," [online], May 3, 2016 [Retrieved on Oct. 5, 2017], the Internet <URL: https://www.youtube.com/watch?v=TckqNdrdbgk>

BRIEF SUMMARY

Technical Problems

According to the above-described 2D input, the position of the electronic pen is fixed in a known plane and therefore high accuracy can be obtained compared with the 3D input. However, meanwhile, in the 2D input, there is a problem that intuitive manipulation is difficult compared with the 3D input because the 2D input is limited to drawing in the plane.

In contrast to this, according to the 3D input, intuitive manipulation becomes possible. Meanwhile, there is a problem that the accuracy is insufficient as a technique used for the purpose of design because the flexibility in the position of the controller is high.

Therefore, one of objects of the present disclosure is to provide a rendering device and a rendering method that can implement intuitive drawing with high accuracy in a virtual reality space.

Technical Solution

A first aspect of the present disclosure relates to a rendering device that renders a 3D object in a virtual reality space displayed on a virtual reality display. The rendering device includes a processor; and a memory storing instructions that, when executed by the processor, cause the processor to: render the 3D object as a 3D object of 3D displaying in a virtual reality space coordinate system, render the 3D object as a 3D object of 2D displaying in a plane coordinate system, and update displaying of the virtual reality display based on a result of the 3D object being rendered as the three-dimensional object of three-dimensional displaying in the virtual reality space coordinate system and displaying of the virtual reality display based on a result of the 3D object being rendered as the 3D object of 2D displaying in the plane coordinate system.

A second aspect of the present disclosure relates to a rendering method for rendering a 3D object in a virtual reality space displayed on a virtual reality display. The rendering method includes rendering the 3D object as a 3D object of 3D displaying in a virtual reality space coordinate system, rendering the 3D object as a 3D object of 2D displaying in a plane coordinate system, and updating displaying of the virtual reality display based on a result of the rendering the 3D object as the three-dimensional object of three-dimensional displaying in the virtual reality space coordinate system and the displaying of the virtual reality display based on a result of the rendering 3D object as the 3D object of 2D displaying in the plane coordinate system.

Advantageous Effect

According to the present disclosure, the display method (3D displaying or 2D displaying) of the 3D object in the virtual reality space can be switched according to selection by the user and therefore it becomes possible to implement intuitive drawing with high accuracy in the virtual reality space.

BRIEF DESCRIPTION OF THE DRAWINGS

FIG. 7 is a diagram illustrating a state in which 3D input of a 3D object is being carried out in a virtual reality space according to the first embodiment of the present disclosure.

MODES FOR CARRYING OUT THE DISCLOSURE

Embodiments of the present disclosure will be described in detail below with reference to the accompanying drawings.

Figure 1:
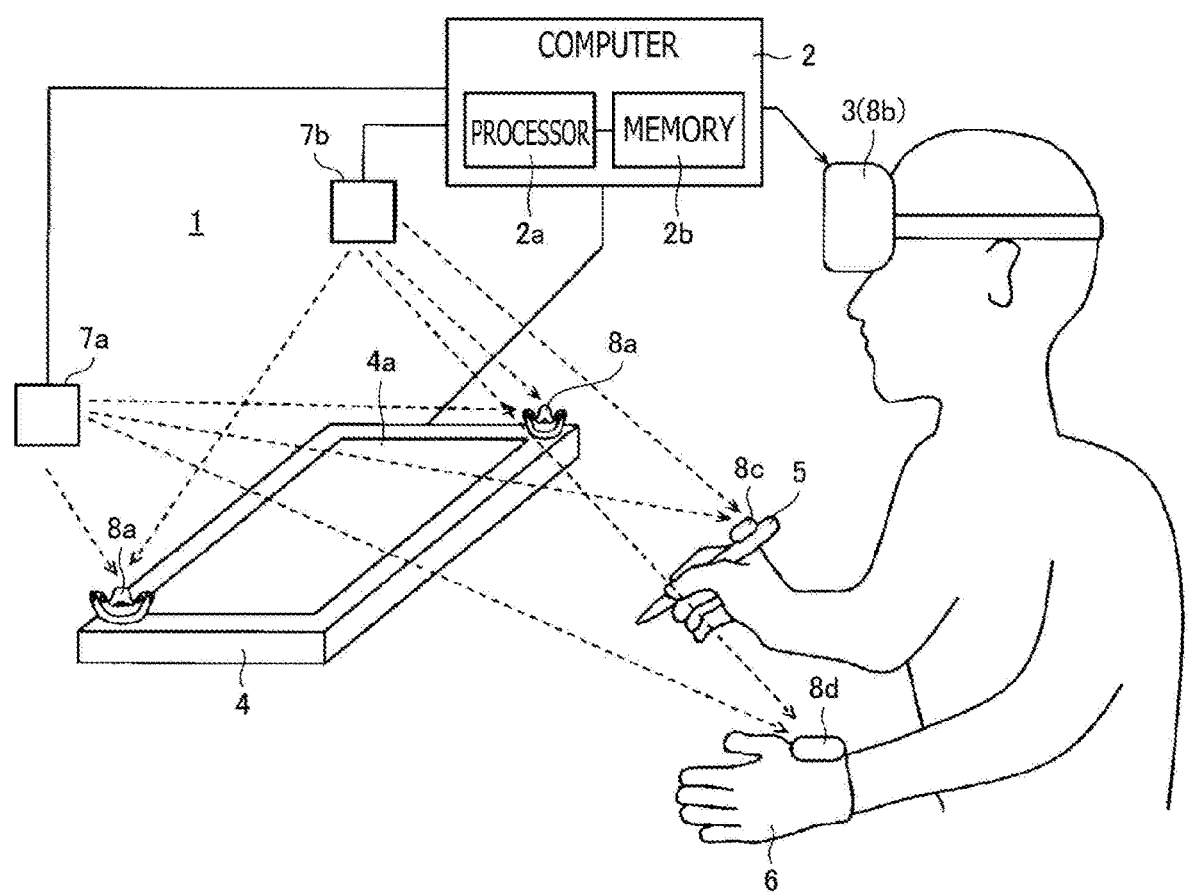
FIG. 1 is a diagram illustrating a configuration of a 3D object rendering system 1 according to a first embodiment of the present disclosure.

FIG. 1 is a diagram illustrating a configuration of a 3D object rendering system 1 according to a first embodiment of the present disclosure. As illustrated in this diagram, the 3D object rendering system 1 according to the present embodiment is configured to include a computer 2, a virtual reality display 3, a tablet 4, an electronic pen 5, a glove unit 6, lightning houses 7a and 7b, and position sensors 8a to 8d. The position sensors 8a, 8c, and 8d are attached to the tablet 4, the electronic pen 5, and the glove unit 6, respectively, and the position sensor 8b is disposed in the virtual reality display 3. Due to the attaching of the position sensor 8c, the electronic pen 5 functions as a stylus and functions also as a controller. The position sensor 8c may be incorporated in the electronic pen 5.

Each device illustrated in FIG. 1 is disposed in a room in principle. In the 3D object rendering system 1, almost the whole room can be used as a virtual reality space.

The computer 2 includes a processor 2a (controller) and a memory 2b that cooperates with the processor 2a. Each kind of processing performed by the computer 2 to be described later can be implemented through cooperation between the processor 2a and the memory 2b (more specifically, through reading-out and execution of a program stored in the memory 2b). In other words, the memory 2b stores instructions that, when executed by the processor 2a, causes the computer 2 to perform the various kinds of processing described herein.

The computer 2 is connected to each of the virtual reality display 3 and the lightning houses 7a and 7b in a wired or wireless manner. In FIG. 1, an example in which the computer 2 is connected to each of the virtual reality display 3 and the lightning houses 7a and 7b based on a wired communication standard such as USB (Universal Serial Bus) is illustrated. Furthermore, as described in detail later, the computer 2 is connected also to the tablet 4 in a wired or wireless manner if the tablet 4 has a communication function. In FIG. 1, an example in which the computer 2 and the tablet 4 are connected based on a short distance wireless communication standard such as Bluetooth (registered trademark), for example, is illustrated. If the tablet 4 or the virtual reality display 3 includes functions as a computer, the computer 2 may be configured by the computer.

The computer 2 is configured to have a function of displaying a virtual reality space on the virtual reality display 3. This virtual reality space may be a VR (Virtual Reality) space or may be an AR (Augmented Reality) space or may be an MR (Mixed Reality) space. In the case of displaying a VR space, the user who wears the virtual reality display 3 recognizes virtual reality and is separated from the actual world. On the other hand, in the case of displaying an AR space or MR space, the user who wears the virtual reality display 3 recognizes a space in which virtual reality and the actual world are mixed.

The computer 2 is configured to function as a rendering device that sets a virtual reality space based on the positions of the lightning houses 7a and 7b and carries out rendering of various 3D objects in the set virtual reality space. The computer 2 updates displaying of the virtual reality display 3 based on the result of the rendering. Due to this, various 3D objects appear in the virtual reality space displayed on the virtual reality display 3.

The rendering by the computer 2 is carried out based on a 3D object stored in the memory 2b. The 3D object is information that represents the shape, position, and orientation of a 3D object in a virtual reality space coordinate system that represents the virtual reality space set by the computer 2, and is stored in the memory 2b regarding each 3D object of a rendering target.

In the 3D objects rendered by the computer 2, 3D objects that represent each of the tablet 4, the electronic pen 5, and the glove unit 6 illustrated in FIG. 1 are included. In rendering of these 3D objects, first the computer 2 detects the position and orientation of each of the position sensors 8a to 8d in the virtual reality space coordinate system. Furthermore, the computer 2 is configured to acquire point-of-view information that represents the point of view of the user based on the detected position and orientation of the position sensor 8b and carry out rendering of the 3D objects that represent each of the tablet 4, the electronic pen 5, and the glove unit 6 in the virtual reality space based on the acquired point-of-view information, the shape of each 3D object stored, and the detected position and orientation of each of the position sensors 8a, 8c, and 8d.

Moreover, the computer 2 is configured to be capable of detecting manipulation carried out by the user in the virtual reality space by detecting the position of the position sensors 8c and 8d and newly creating a 3D object or updating a 3D object that has been already held based on the result thereof.

The virtual reality display 3 is a VR display mounted on the head of a human to be used (head-mounted display). As virtual reality displays that are generally commercially available, there are various kinds of displays such as "transmissive type" or "non-transmissive type" and "glasses type" or "hat type." Any can be used as the virtual reality display 3.

The virtual reality display 3 is connected to each of the position sensor 8a, the electronic pen 5 (including position sensor 8c), and the glove unit 6 (including position sensor 8d) in a wired or wireless manner. The position sensors 8a, 8c, and 8d are configured to notify light reception level information to be described later to the virtual reality display 3 through this connection. The virtual reality display 3 is configured to notify the light reception level information notified from each of the position sensors 8a, 8c, and 8d to the computer 2 with the light reception level information of the position sensor 8b incorporated in the virtual reality display 3. The computer 2 detects the position and orientation of each of the position sensors 8a to 8d in the virtual reality space coordinate system based on the light reception level information thus notified. Furthermore, the electronic pen 5 and the glove unit 6 are configured to notify manipulation information to be described later to the virtual reality display 3 through the above-described connection. The virtual reality display 3 is configured to transfer the manipulation information thus notified to the computer 2.

The tablet 4 has a tablet surface 4a. It is preferable for the tablet surface 4a to be a flat surface, and the tablet surface 4a can be formed of a material suitable to slide the pen tip of the electronic pen 5. In one example, the tablet 4 is what is called a digitizer and is configured to have a touch sensor that detects the indicated position by the electronic pen 5 in a touch surface and a communication function of notifying the detected indicated position to the computer 2. The tablet surface 4a in this case is formed of the touch surface of the digitizer. In another example, the tablet 4 is what is called a tablet computer and is configure to have a display, a touch sensor that detects the indicated position by the electronic pen 5 in a display surface of this display, and a communication function of notifying the detected indicated position to the computer 2. The tablet surface 4a in this case is formed of the display surface of the display. In further another example, the tablet 4 is a physical object that does not have a function of detecting the indicated position by the electronic pen 5 (including mere plate, table, display or computer that does not have a function of detecting the indicated position by the electronic pen 5). The tablet surface 4a in this case is formed of a flat surface made in the surface of the tablet 4.

The position sensors 8a are fixedly set on the surface of the tablet 4. Therefore, the position and orientation of the position sensors 8a detected by the computer 2 represent the position and orientation of the tablet surface 4a in the virtual reality space coordinate system.

The electronic pen 5 and the glove unit 6 enable the user to indicate the position in the virtual reality space. The electronic pen 5 is configured to have a pen shape. The glove unit 6 has a shape as a glove worn on a hand of the user.

Various sensing devices such as a switch are disposed on the surface of the electronic pen 5 or inside the electronic pen 5. The term sensing device here includes a sensor configured to be capable of detecting any physical quantity besides a changeover switch that takes either the on-state or the off-state. As an example of the switch disposed for the electronic pen 5, a side switch or tail switch configured to be capable of accepting on/off-manipulation by the user is cited. Furthermore, as an example of another switch disposed for the electronic pen 5, a capacitance sensor that detects the pressure (writing pressure) applied to the pen tip of the electronic pen 5 are also cited. The electronic pen 5 is configured to detect the output of the switch disposed for the electronic pen 5 (pressed-down state or detected physical quantity) and notify all or part of the detection result to the virtual reality display 3 as its own manipulation information.

As the sensing device disposed for the electronic pen 5, a force sensor (load sensor) that detects the gripping force of the electronic pen 5 by the user may be included. In this case, although the output of the force sensor is not what represents the writing pressure originally, the computer 2 that has received notification of the output of the force sensor may treat it as data that represents the writing pressure (writing pressure data). This makes it possible to reflect the writing pressure in the drawing result even when the user manipulates the electronic pen 5 in the air.

If the tablet 4 has a touch sensor, the position of the electronic pen 5 is detected also by this touch sensor. The position detected by the touch sensor is not a position in the virtual reality space coordinate system but a position in a tablet surface coordinate system defined on the tablet surface 4a. The touch sensor is configured to notify the detected position of the electronic pen 5 to the computer 2.

In general, the position detected by the touch sensor has higher accuracy than the position detected by using the position sensor 8c. Therefore, it is preferable for the computer 2 to acquire not a position detected through the position sensor 8c but a position notified from the touch sensor as the position of the electronic pen 5 when the position of the electronic pen 5 has been notified from the touch sensor. In this case, it is preferable for the computer 2 to convert the position notified from the touch sensor to a position in the virtual reality space coordinate system by associating the tablet surface coordinate system with the virtual reality space coordinate system based on the position and orientation of the tablet surface 4a detected by using the position sensors 8a.

Figure 2:
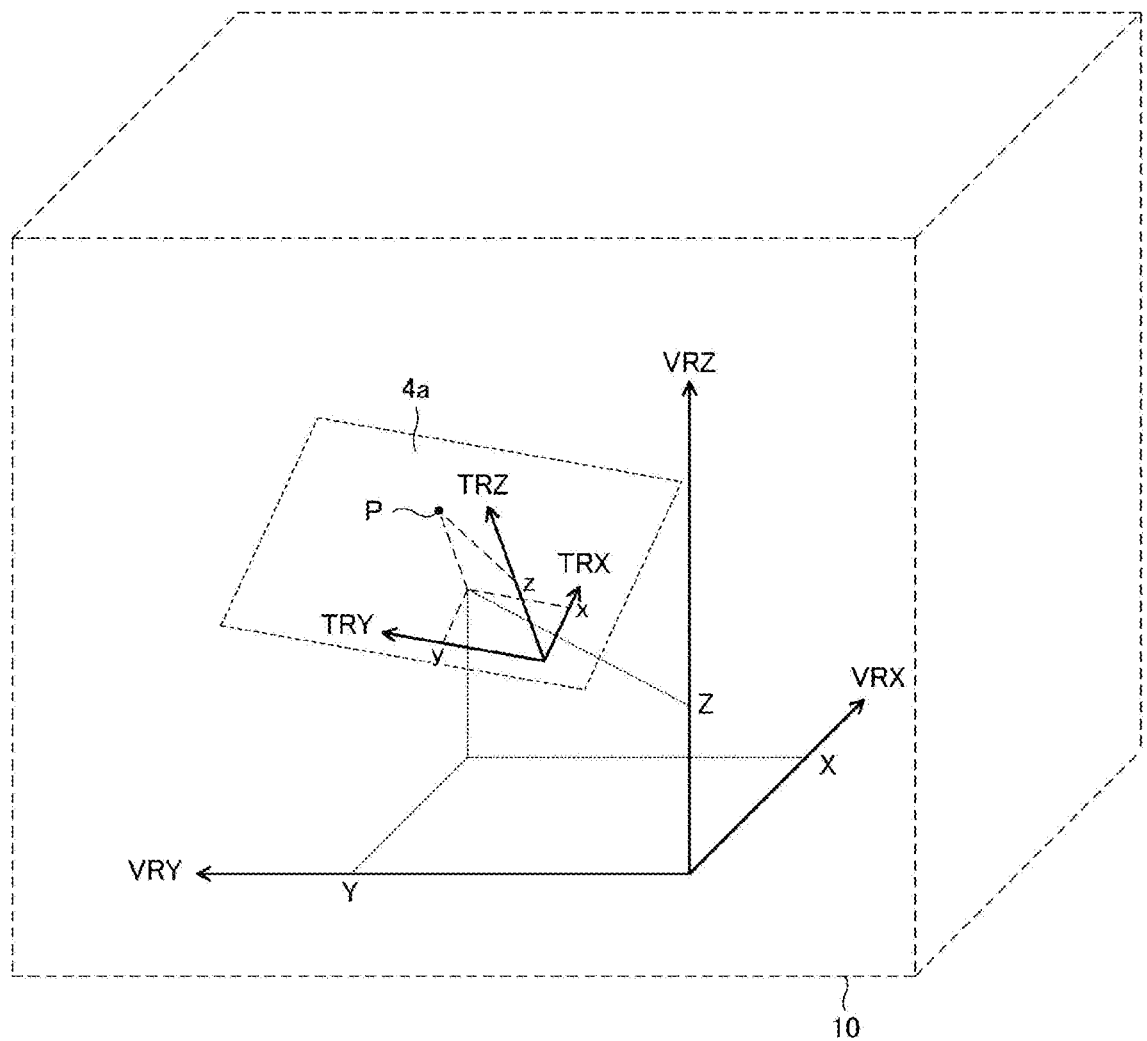
FIG. 2 is a diagram explaining a relationship between a tablet surface coordinate system and a virtual reality space coordinate system.

FIG. 2 is a diagram explaining the relationship between the tablet surface coordinate system and the virtual reality space coordinate system. In this diagram, the state in which the tablet surface 4a is located in a virtual reality space 10 is illustrated. The virtual reality space coordinate system is defined by three axes VRX, VRY, and VRZ and the tablet surface coordinate system is defined by three axes TRX, TRY, and TRZ. The axis TRZ is the normal direction of the tablet surface 4a. When a position P illustrated in the diagram is detected as a position (x, y, z) in the tablet surface coordinate system by the touch sensor (z represents the hover position, for example), the computer 2 converts this (x, y, z) to a position (X, Y, Z) in the virtual reality space coordinate system by predetermined conversion processing. This makes it possible to convert the position notified from the touch sensor to the position in the virtual reality space coordinate system.

Here, for the position detection of the electronic pen 5 by the touch sensor, the electromagnetic induction system may be used or the active capacitive system may be used. When the active capacitive system is used, the touch sensor is configured to send out a beacon signal from a sensor electrode (not illustrated) disposed in the touch surface at predetermined time intervals. In the beacon signal, a command for controlling the electronic pen 5 from the touch sensor is included. In the contents of control based on the command, for example, transmission of writing pressure data (what has been detected by a capacitance sensor) that represents the pressure applied to the pen tip of the electronic pen 5, transmission of the pressed-down state of various switches (not illustrated) disposed for the electronic pen 5, transmission of a unique ID (Identification) stored in the electronic pen 5 in advance, are included.

When detecting the above-described beacon signal, the electronic pen 5 compatible with the active capacitive system sends out a pen signal as a response signal. The pen signal is a signal including a burst signal that is an unmodulated carrier wave and a data signal obtained by modulating a carrier wave with data according to the above-described command. The touch sensor attempts detection of the burst signal by the above-described sensor electrode and detects the position of the electronic pen 5 based on the detection result. Furthermore, the touch sensor receives data transmitted by the electronic pen 5 according to the command by detecting the data signal by the above-described sensor electrode and demodulating the data signal. The tablet 4 is configured to transmit the position of the electronic pen 5 and the data transmitted by the electronic pen 5, acquired in this manner, to the computer 2. The computer 2 is configured to convert the position thus notified to the position in the virtual reality space coordinate system in the above-described manner and acquire the notified data as part of the above-described manipulation information.

The lightning houses 7a and 7b are signal transmitting devices for position detection used in the 3D object rendering system 1 and are each configured to be capable of emitting a signal, laser light in this example, while changing the direction in accordance with control by the computer 2. The position sensors 8a to 8d are each composed of plural light receiving sensors and are configured to receive the signal (laser light) applied by each of the lightning houses 7a and 7b by the respective light receiving sensors and acquire light reception level information including the respective light reception levels. The acquired light reception level information is notified from the respective position sensors 8a to 8d to the computer 2 and is used for detecting the position and orientation of them as described above.

The overall outline of the 3D object rendering system 1 is described above. When a user inputs a new 3D object in such a 3D object rendering system 1, until now, either of the following operations is carried out: 3D input is carried out by using the electronic pen 5 and the glove unit 6; and a tablet computer is employed as the tablet 4 and 2D input is carried out to this tablet computer by using the electronic pen 5. However, as described above, the 3D input involves a disadvantage that the accuracy is insufficient while having an advantage that intuitive manipulation becomes possible. Furthermore, the 2D input involves a disadvantage that intuitive manipulation is difficult whereas high accuracy can be obtained.

In view of problems of such conventional input methods, the 3D object rendering system 1 according to the present embodiment enables implementation of intuitive drawing with high accuracy in a virtual reality space by allowing the display method (3D displaying or 2D displaying) of a 3D object in the virtual reality space to be switched by selection by the user. This point will be described in detail below with reference to a flowchart of processing performed by the processor 2a of the computer 2.

Figure 3:
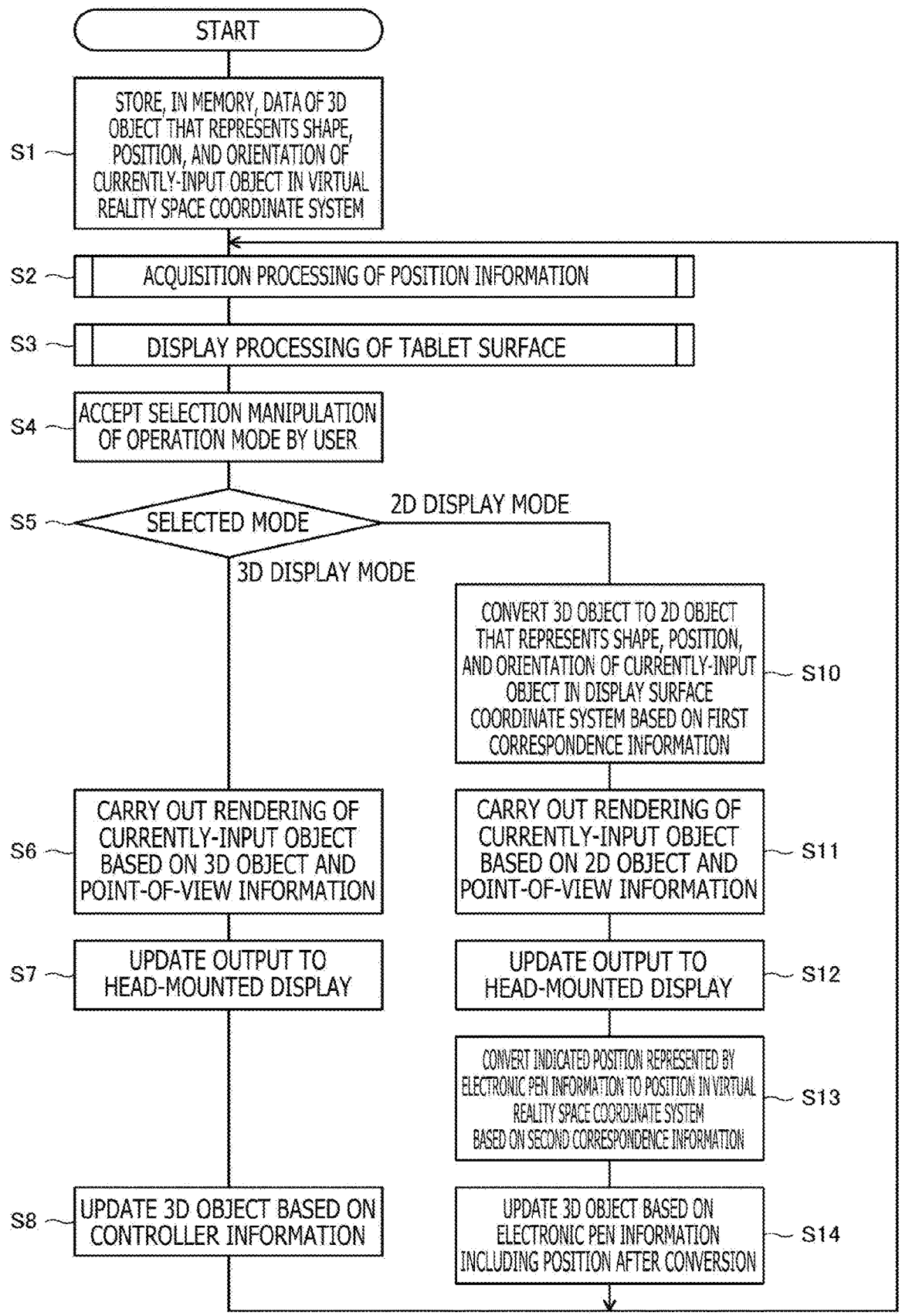
FIG. 3 is a flowchart illustrating processing performed by a processor 2a illustrated in FIG. 1.

FIG. 3 is the flowchart illustrating the processing performed by the processor 2a of the computer 2. This processing is performed when a user inputs a 3D object by using at least one of the electronic pen 5 and the glove unit 6, and is started through performance of predetermined manipulation by the user with use of the electronic pen 5 and the glove unit 6 and detection of it by the processor 2a.

As illustrated in FIG. 3, first the processor 2a stores, in the memory 2b, data of a 3D object that represents the shape, position, and orientation of a currently-input object in a virtual reality space coordinate system (S1). Although the specific format of the 3D object is not particularly limited, it is preferable to employ data of a VRML (Virtual Reality Modeling Language) format or X3D (eXtensible 3D) format, for example.

Next, the processor 2a performs acquisition processing of position information (S2).

Figure 4:
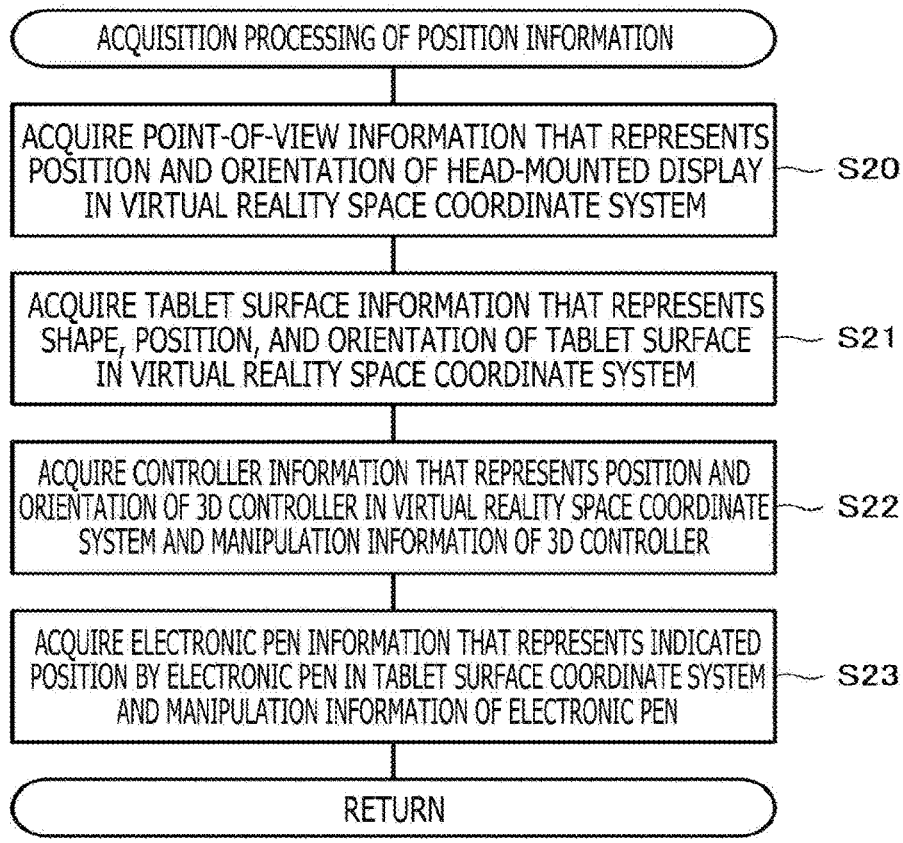
FIG. 4 is a flowchart illustrating details of acquisition processing of position information illustrated in FIG. 2.

FIG. 4 is a flowchart illustrating details of the acquisition processing of position information performed at S2. As illustrated in this diagram, the processor 2a performs the acquisition processing of position information by acquiring point-of-view information (S20), acquiring tablet surface information (S21), acquiring controller information (first information) (S22, controller information acquisition, first information acquisition processing), and acquiring electronic pen information (second information) (S23, electronic pen information acquisition, second information acquisition processing). The order of performance of S20 to S23 is not particularly limited.

The point-of-view information is information that represents the point of view of the user in the virtual reality space coordinate system and specifically is represented by the position and orientation of the virtual reality display 3. The processor 2a is configured to acquire the point-of-view information based on the position and the orientation detected regarding the position sensor 8b. The specific point-of-view information is composed of vector information having one three-dimensional coordinate as the starting point, for example.

The tablet surface information is information that represents the shape, position, and orientation of the tablet surface 4a in the virtual reality space coordinate system and is stored in the memory 2b as one of 3D objects. The processor 2a acquires the tablet surface information based on the position and the orientation detected regarding the position sensors 8a and the shape of the tablet 4 stored in advance.

The controller information is information that represents the position and orientation of the 3D controller (including electronic pen 5 and glove unit 6) in the virtual reality space coordinate system and manipulation information of this 3D controller. The processor 2a acquires the controller information based on the position and the orientation detected regarding the position sensors 8c and 8d and manipulation information of each of the electronic pen 5 and the glove unit 6 received through the virtual reality display 3.

The electronic pen information is information that represents the indicated position by the electronic pen 5 in the tablet surface coordinate system and manipulation information of the electronic pen 5. When the tablet 4 has a touch sensor, the processor 2a acquires the indicated position by the electronic pen 5 in the tablet surface coordinate system from the touch sensor. On the other hand, when the tablet 4 does not have the touch sensor, the processor 2a acquires the indicated position by the electronic pen 5 in the tablet surface coordinate system by performing conversion processing (reverse processing of conversion processing described with reference to FIG. 2) for the position acquired from the position sensor 8c (position in the virtual reality space coordinate system). Furthermore, when the processor 2a can acquire the manipulation information of the electronic pen 5 from the touch sensor (for example, when the electronic pen 5 is compatible with the active capacitive system), the processor 2a acquires the manipulation information of the electronic pen 5 (including output of the capacitance sensor) from the touch sensor. On the other hand, when the processor 2a cannot acquire the manipulation information of the electronic pen 5 from the touch sensor, the processor 2a acquires the manipulation information of the electronic pen 5 (including output of the force sensor) through the virtual reality display 3.

Referring back to FIG. 3, the processor 2a that has performed the acquisition processing of position information subsequently performs display processing of tablet surface (S3). This processing is processing for displaying, in the virtual reality space, a tablet surface image that illustrates the tablet surface and a display surface image that illustrates a display surface for 2D displaying of a currently-input 3D object.

Figure 5:
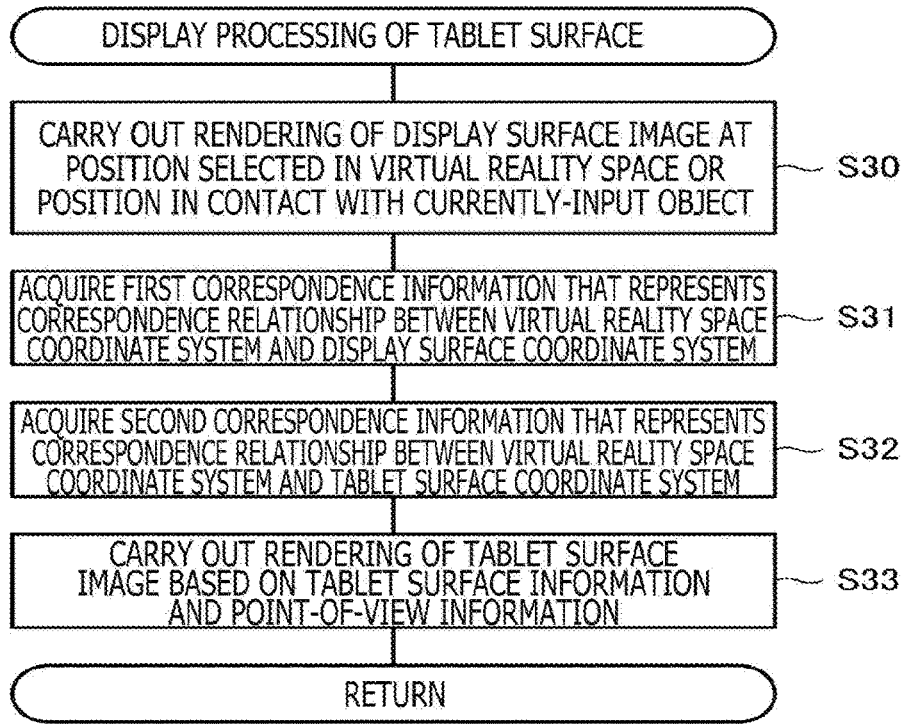
FIG. 5 is a flowchart illustrating details of tablet terminal display processing illustrated in FIG. 2.

FIG. 5 is a flowchart illustrating details of the display processing of tablet surface performed in the S3. As illustrated in this diagram, first the processor 2a carries out rendering of the display surface image based on a position selected by the user in the virtual reality space or a position in contact with the currently-input 3D object (S30, display surface image rendering (processing)). The selection of the position by the user is carried out through pressing-down of a switch disposed for the electronic pen 5 by the user and notification of manipulation information representing this to the processor 2a, for example. The display surface image may be what imitates a display or may be a mere rectangular frame. It is preferable for the processor 2a to carry out rendering of the display surface image in such a manner that the normal direction of the display surface image corresponds with the direction of the line of sight of the user based on the point-of-view information acquired at S20 in FIG. 4.

Next, the processor 2a acquires first correspondence information that represents the correspondence relationship between the virtual reality space coordinate system and a display surface coordinate system defined on the display surface (first plane coordinate system) (S31). Specifically, the first correspondence information is a conversion rule for mutually converting the virtual reality space coordinate system and the display surface coordinate system.

Subsequently, the processor 2a acquires second correspondence information that represents the correspondence relationship between the virtual reality space coordinate system and the tablet surface coordinate system (second plane coordinate system) (S32). Specifically, the second correspondence information is a conversion rule for mutually converting the virtual reality space coordinate system and the tablet surface coordinate system.

At last, the processor 2a carries out rendering of the tablet surface image that represents the tablet surface 4a based on the tablet surface information and the point-of-view information (S33, tablet surface image rendering (processing)). The tablet surface image may be what imitates a touch surface of a tablet terminal or may be a mere rectangular frame. It is preferable for the processor 2a to carry out rendering of the tablet surface image in such a manner that the angle formed by the direction of the line of sight of the user and the tablet surface 4a (angle of depression) becomes a predetermined value based on the point-of-view information acquired at S20 in FIG. 4.

Referring back to FIG. 3, the processor 2a that has performed the display processing of tablet surface subsequently accepts selection manipulation of the operation mode by the user (S4). For example, this selection may be carried out through pressing-down of a switch disposed for the electronic pen 5 by the user or may be carried out through changing the distance between the tablet surface 4a and the electronic pen 5 by the user. For example, switching to the 2D displaying may be carried out when the distance between the tablet surface 4a and the electronic pen 5 has become shorter than a predetermined distance, and switching to the 3D displaying may be automatically carried out when the distance between the tablet surface 4a and the electronic pen 5 has become equal to or longer than the predetermined distance. In the latter case, the distance between the tablet surface 4a and the electronic pen 5 may be detected by the touch sensor or may be detected by the processor 2a based on the display position of the tablet surface image and the position of the electronic pen 5 that has been detected by using the position sensor 8c. The processor 2a that has accepted the selection manipulation at S4 performs processing of making an entry into either one of the 3D display mode or the 2D display mode according to the contents of the selection (that is, display selection processing of selecting either one of 3D displaying or 2D displaying) (S5, mode selection).

When an entry into the 3D display mode is made at S5, the processor 2a carries out a 3D rendering act (processing) of rendering a 3D object in the virtual reality space coordinate system on the virtual reality display 3. Specifically, first the processor 2a carries out rendering of the currently-input object and other 3D objects based on the 3D object stored in the memory 2b and the point-of-view information acquired at S20 in FIG. 4 (S6). Then, the processor 2a updates the output to the virtual reality display 3 (displaying) based on the result thereof (S7, display update (processing)). At this time, other displays in the virtual reality space, such as the display surface image rendered at S30 in FIG. 5 and the tablet surface image rendered at S33 in FIG. 5, are also simultaneously updated. This enables the user to edit the currently-input object by the 3D input.

Moreover, the processor 2a updates the 3D object of the currently-input object stored in the memory 2b based on the controller information acquired at S22 in FIG. 4 (S8, 3D object update (processing)). Thereafter, the processor 2a returns to the S2 to continue the processing.

Here, the update of the 3D object at S8 and S14 to be described later is carried out also based on the manipulation information that has been notified from the electronic pen 5. For example, when data that represents the output of the capacitance sensor or the output of the force sensor is notified from the electronic pen 5, the computer 2 acquires this data as writing pressure data and decides the line width and transparency of the currently-input object based on the acquired writing pressure data. Then, the computer 2 reflects the decision result in the 3D object.

The processor 2a when an entry into the 2D display mode is made at S5 carries out a 2D rendering act (processing) of rendering a 3D object on the virtual reality display 3 as a 3D object of the 2D displaying in the display surface coordinate system. Specifically, first, the processor 2a converts the 3D object of the currently-input object stored in the memory 2b to a 2D object that represents the shape, position, and orientation of the currently-input object in the display surface coordinate system based on the first correspondence information acquired at S31 in FIG. 5 (S10, first conversion). Then, the processor 2a carries out rendering of the currently-input object based on the obtained 2D object and the point-of-view information acquired at S20 in FIG. 4 (S11) and updates the output to the virtual reality display 3 (displaying) based on the result thereof (S12, display update (processing)). Also at this time, similarly to S7, other displays in the virtual reality space, such as the display surface image rendered at S30 in FIG. 5 and the tablet surface image rendered at S33 in FIG. 5, are simultaneously updated. This enables the user to edit the currently-input object by the 2D input.

Subsequently, the processor 2a converts the indicated position represented by the electronic pen information acquired at S23 in FIG. 4 to a position in the virtual reality space coordinate system based on the second correspondence information acquired at S32 in FIG. 5 (S13, second conversion). Then, the processor 2a updates the 3D object of the currently-input object stored in the memory 2b based on the electronic pen information including the obtained indicated position (S14, 3D object update). As described above, this update is carried out also based on the manipulation information that has been notified from the electronic pen 5. Thereafter, the processor 2a returns to S2 and continues the processing.

Figure 6:
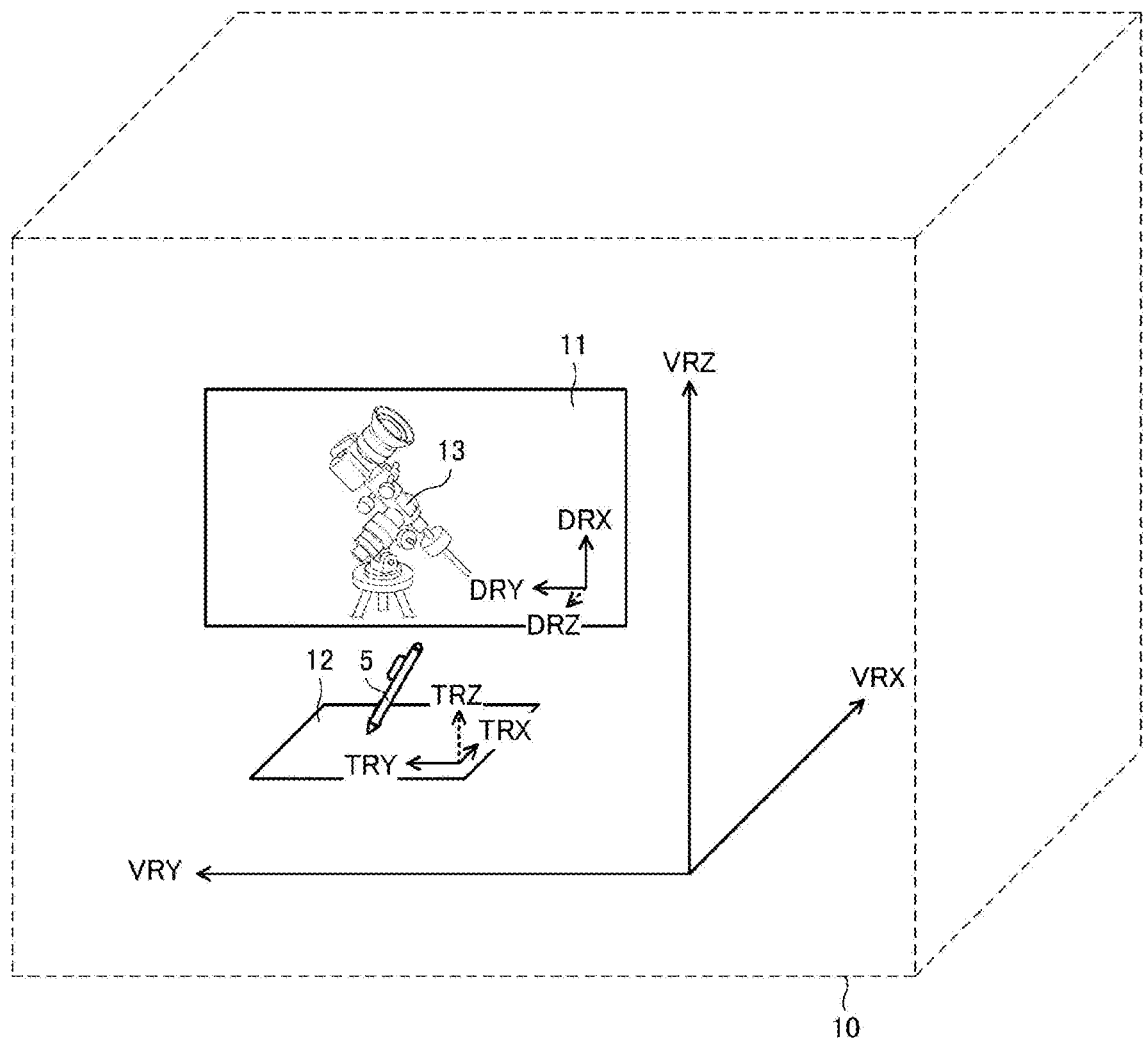
FIG. 6 is a diagram illustrating a state in which 2D input of a 3D object is being carried out in a virtual reality space according to the first embodiment of the present disclosure.

FIG. 6 is a diagram illustrating a state in which 2D input of a 3D object is being carried out in a virtual reality space (state in which a user has selected the 2D display mode at S4 in FIG. 3). FIG. 7 is a diagram illustrating a state in which 3D input of a 3D object is being carried out in a virtual reality space (state in which a user has selected the 3D display mode at S4 in FIG. 3).

As illustrated in FIG. 6, in the 2D display mode, 2D displaying of a currently-input object 13 is carried out in a rectangular display surface image 11 displayed in a virtual reality space 10. Three axes DRX, DRY, and DRZ illustrated in the display surface image 11 represent the display surface coordinate system. The axis DRZ in the three axes is the normal direction of the display surface image 11. Furthermore, a rectangular tablet surface image 12 is displayed and the user edits the currently-input object 13 by moving the electronic pen 5 in the tablet surface image 12. This editing is carried out by moving the electronic pen 5 on the plane and therefore is 2D input. Although being invisible for the user who wears the virtual reality display 3, the tablet surface 4a actually exists at the position at which the tablet surface image 12 is displayed. Therefore, the user can move the electronic pen 5 in the tablet surface image 12 while feeling touch of the tablet surface 4a.

On the other hand, as illustrated in FIG. 7, in the 3D display mode, 3D displaying of the currently-input object 13 is carried out in the virtual reality space 10. The user edits the currently-input object 13 by moving the electronic pen 5 and the glove unit 6 in the virtual reality space 10. This editing is carried out by using the controller for 3D input and therefore is 3D input.

As described above, according to the 3D object rendering system 1 in accordance with the present embodiment, the display method (3D displaying or 2D displaying) of the 3D object in the virtual reality space can be switched by selection by the user and it becomes possible to implement intuitive drawing with high accuracy in the virtual reality space. Furthermore, editing of the 3D object by 2D input is enabled while the 2D displaying is carried out, and editing of the 3D object by 3D input is enabled while the 3D displaying is carried out. Therefore, it becomes possible to edit the 3D object by the input method suitable for the display method.

Furthermore, according to the 3D object rendering system 1 in accordance with the present embodiment, it becomes possible to input the 3D object by the electronic pen 5 in the virtual reality space.

Next, a 3D object rendering system 1 according to a second embodiment of the present disclosure will be described. In that the display surface coordinate system and the tablet surface coordinate system are set to the same coordinate system, the 3D object rendering system 1 according to the present embodiment is different from the 3D object rendering system 1 according to the first embodiment, in which they are coordinate systems different from each other. The 3D object rendering system 1 according to the present embodiment is the same as the 3D object rendering system 1 according to the first embodiment in the other points. Therefore, the same configuration as the first embodiment is given the same symbol and description will be made below with focus on the difference from the first embodiment.

Figure 8:
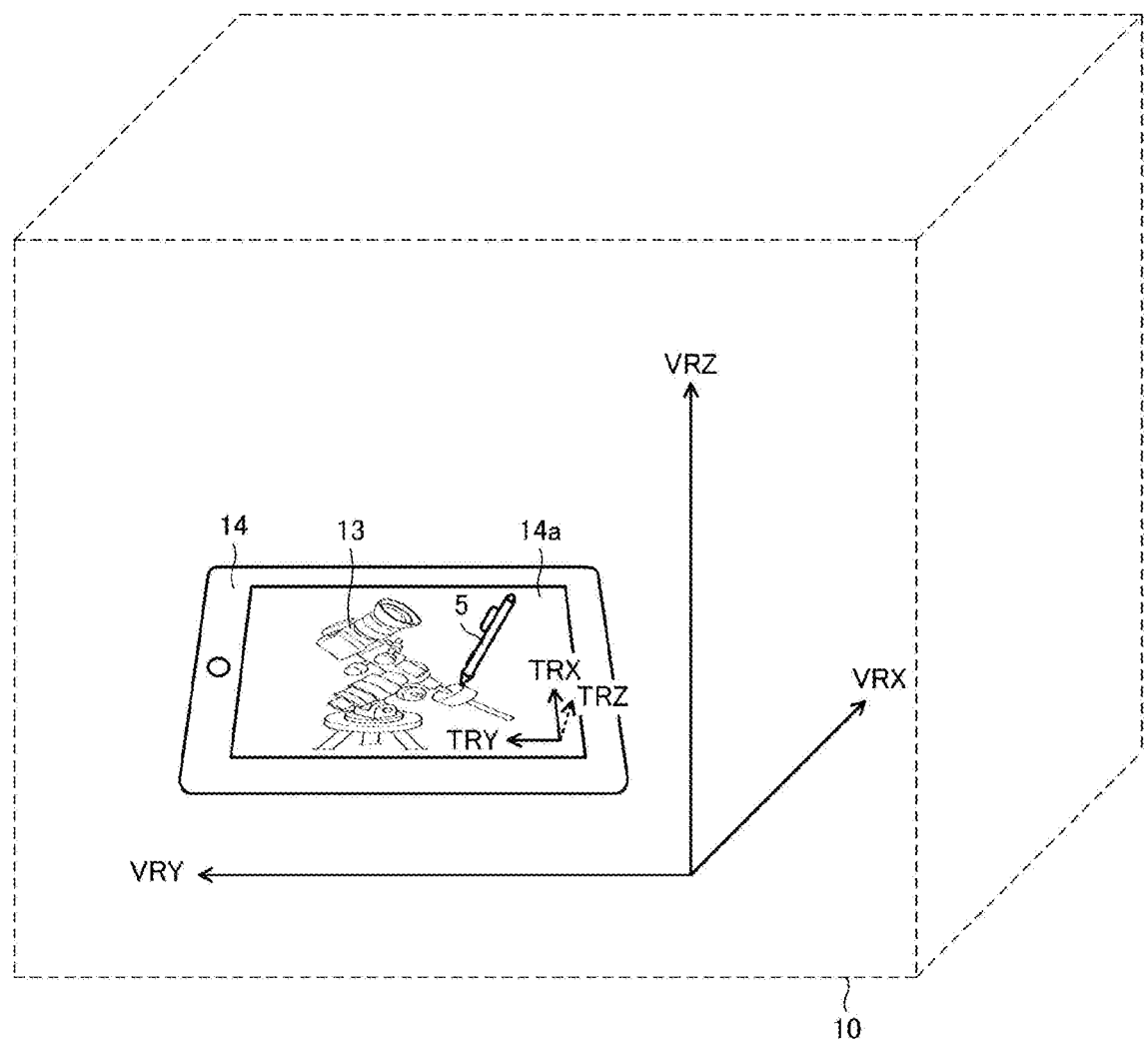
FIG. 8 is a diagram illustrating a state in which 2D input of a 3D object is being carried out in a virtual reality space according to a second embodiment of the present disclosure.

FIG. 8 is a diagram illustrating a state in which 2D input of a 3D object is being carried out in a virtual reality space according to the present embodiment. First, the outline of the present embodiment will be described with reference to this FIG. 8. The processor 2a according to the present embodiment is configured to carry out rendering of a tablet terminal image 14 that illustrates the tablet 4 (tablet terminal) illustrated in FIG. 1 in the virtual reality space. A tablet surface image 14a included in the tablet terminal image 14 corresponds to both the tablet surface image and the display surface image described in the first embodiment. Therefore, the tablet surface coordinate system (axes TRX, TRY, and TRZ) doubles as the display surface coordinate system in the present embodiment. As a result, in the 2D display mode, 2D displaying of the currently-input object 13 is carried out in the tablet surface image 14a as illustrated in FIG. 8.

Figure 9A:
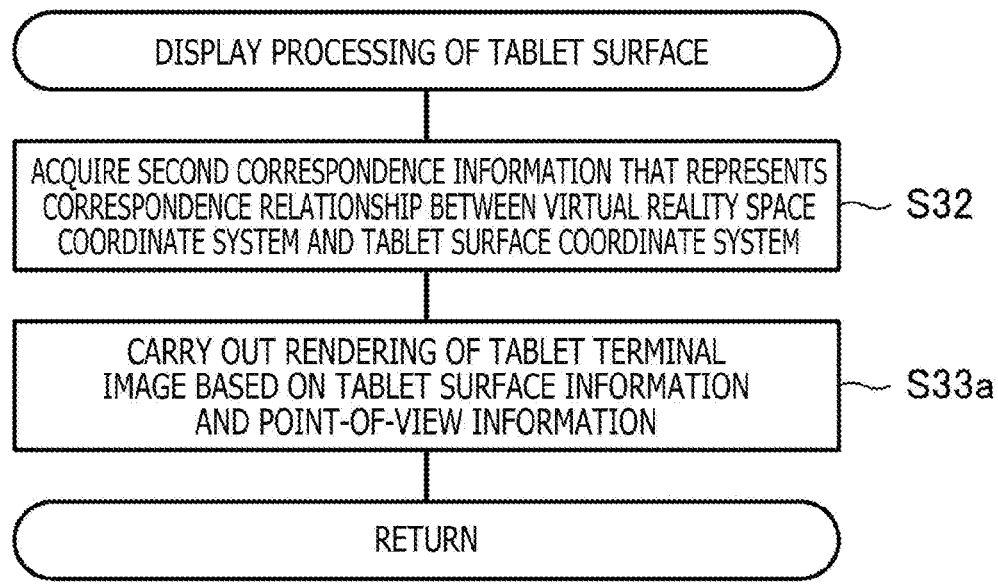
FIGS. 9A and 9B are flowcharts illustrating part of processing performed by the processor 2a according to the second embodiment of the present disclosure.
Figure 9B:
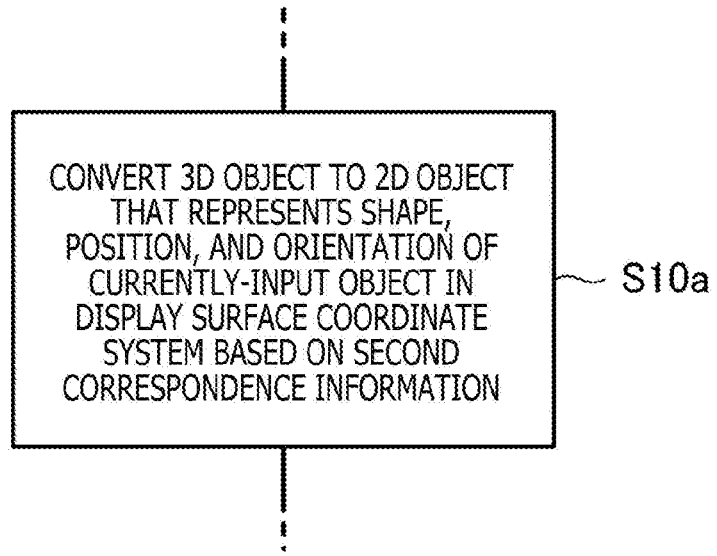

FIGS. 9A and 9B are flowcharts illustrating part of processing performed by the processor 2a according to the present embodiment. FIG. 9A is what replaces the flowchart illustrated in FIG. 5. Meanwhile, FIG. 9B is what replaces S10 illustrated in FIG. 3.

As illustrated in FIG. 9A, the processor 2a according to the present embodiment is configured not to carry out the S30 and S31 illustrated in FIG. 5 and to carry out S33a instead of S33. At S33a, the processor 2a carries out rendering of the tablet terminal image that illustrates the tablet 4 (tablet terminal) illustrated in FIG. 1 based on the tablet surface information and the point-of-view information (tablet terminal image rendering (processing)). Due to this, as illustrated in FIG. 8, the tablet terminal (tablet terminal image 14) similar to the actual tablet 4 (tablet terminal) appears in the virtual reality space 10.

Furthermore, as illustrated in FIG. 9B, the processor 2a according to the present embodiment performs processing of converting the 3D object of the currently-input object stored in the memory 2b to a 2D object that represents the shape, position, and orientation of the currently-input object in the display surface coordinate system based on not the first correspondence information but the second correspondence information acquired at S32 in order to obtain 2D object information used in rendering of the currently-input object in the 2D display mode (S10a). As a result, as illustrated in FIG. 8, the currently-input object 13 (that is, position of the electronic pen 5 in the virtual reality space coordinate system acquired by the controller information acquisition (S22)) is displayed in the tablet surface image 14a.

Also by the 3D object rendering system 1 according to the present embodiment, the display method (3D displaying or 2D displaying) of the 3D object in the virtual reality space can be switched by selection by the user. Therefore, it becomes possible to implement intuitive drawing with high accuracy in the virtual reality space. Furthermore, editing of the 3D object by 2D input is enabled while the 2D displaying is carried out, and editing of the 3D object by 3D input is enabled while the 3D displaying is carried out. Therefore, it becomes possible to edit the 3D object by the input method suitable for the display method.

In addition, according to the present embodiment, the user is enabled to obtain an experience of input to the tablet terminal in the virtual reality space. Therefore, it becomes possible to carry out input manipulation of the 3D object as if input manipulation were carried out with a normal tablet terminal.

The preferred embodiments of the present disclosure are described above. However, the present disclosure is not limited to these embodiments at all and the present disclosure can be carried out in various modes in such a range as not to depart from the gist thereof.

DESCRIPTION OF REFERENCE SYMBOLS 1 3D object rendering system
2 Computer
2a Processor
2b Memory
3 Virtual reality display
4 Tablet
4a Tablet surface
5 Electronic pen
6 Glove unit
7a, 7b Lightning house
8a to 8d Position sensor
10 Virtual reality space
11 Display surface
12 Tablet surface image
13 Currently-input object
14 Tablet terminal image
14a Tablet surface image

The invention claimed is:
1. A rendering device that renders a three-dimensional object displayed in a virtual reality space on a display, the rendering device comprising:
a processor; and
a memory storing instructions that, when executed by the processor, cause the processor to:
render the three-dimensional object as a three-dimensional object of three-dimensional displaying in the virtual reality space, render the three-dimensional object as a three-dimensional object of two-dimensional displaying in a surface image displayed in the virtual reality space, update displaying of the display based on a result of the three-dimensional object being rendered as the three-dimensional object of three-dimensional displaying in the virtual reality space, and update displaying of the display based on a result of the three-dimensional object being rendered as the three-dimensional object of two-dimensional displaying in the surface image displayed in the virtual reality space, wherein the three-dimensional object is rendered as the three-dimensional object of three-dimensional displaying in the virtual reality space and the displaying of the display is updated based on the result of the three-dimensional object being rendered as the three-dimensional object of three-dimensional displaying in the virtual reality space before or after the three-dimensional object is rendered as the three-dimensional object of two-dimensional displaying in the virtual reality space and the displaying of the display is updated based on the result of the three-dimensional object being rendered as the three-dimensional object of two-dimensional displaying in the virtual reality space.

2. The rendering device according to claim 1, wherein the instructions, when executed by the processor, cause the processor to:

acquire first information indicating a position of an electronic pen in the virtual reality space, acquire second information indicating a position of the electronic pen in the surface image displayed in the virtual reality space, and update the three-dimensional object in the virtual reality space based on the first information and update the three-dimensional object in the virtual reality space based on the second information.

3. The rendering device according to claim 2, wherein the instructions, when executed by the processor, cause the processor to:

render a tablet terminal image representing a tablet terminal based on a position of the tablet terminal in the virtual reality space, wherein the surface image displayed in the virtual reality space is defined based on a position of the tablet terminal in the virtual reality space.

4. The rendering device according to claim 3, wherein the instructions, when executed by the processor, cause the processor to:

according to a user operation, selectively, display the three-dimensional object as the three-dimensional object of three-dimensional displaying in the virtual reality space and display the three-dimensional object as the three-dimensional object of two-dimensional displaying in the surface image displayed in the virtual reality space.

5. The rendering device according to claim 3, wherein the instructions, when executed by the processor, cause the processor to:

display the electronic pen in the tablet terminal image based on the position of the electronic pen in the virtual reality space indicated by the first information.

6. The rendering device according to claim 2, wherein the instructions, when executed by the processor, cause the processor to:

render a display surface image representing a display surface on which two-dimensional displaying of a currently-input three-dimensional object is carried out, and render a tablet surface image representing a tablet surface based on a position of the tablet surface in the virtual reality space.

7. The rendering device according to claim 6, wherein the display surface image is rendered at a position selected in the virtual reality space or a position in contact with the three-dimensional object in the virtual reality space.

8. The rendering device according to claim 6, wherein the tablet surface is not configured to have a function of detecting a position indicated by the electronic pen.

9. The rendering device according to claim 2, wherein a sensing device is disposed for the electronic pen, and the instructions, when executed by the processor, cause the processor to acquire writing pressure data in response to a manipulation of the sensing device, and update the three-dimensional object based on the writing pressure data acquired.

10. The rendering device according to claim 9, wherein the sensing device is a force sensor that detects a gripping force applied to the electronic pen by the user, wherein the writing pressure data corresponds to the gripping force.

11. A rendering method for rendering a three-dimensional object in a virtual reality space on a display, the rendering method comprising:

rendering the three-dimensional object as a three-dimensional object of three-dimensional displaying in the virtual reality space;

rendering the three-dimensional object as a three-dimensional object of two-dimensional displaying in a surface image displayed in the virtual reality space;

updating displaying of the display based on a result of the rendering the three-dimensional object as the three-dimensional object of three-dimensional displaying in the virtual reality space; and updating displaying of the display based on a result of the rendering the three-dimensional object as the three-dimensional object of two-dimensional displaying in the surface image displayed in the virtual reality space, wherein the rendering the three-dimensional object as the three-dimensional object of three-dimensional displaying in the virtual reality space and the updating displaying of the display based on the result of the three-dimensional object being rendered as the three-dimensional object of three-dimensional displaying in the virtual reality space are performed before or after the rendering the three-dimensional object as the three-dimensional object of two-dimensional displaying in the virtual reality space and the updating displaying of the display based on the result of the three-dimensional object being rendered as the three-dimensional object of two-dimensional displaying in the virtual reality space are performed.

12. The rendering method according to claim 11, further comprising:

acquiring first information indicating a position of an electronic pen in the virtual reality space, acquiring second information indicating a position of the electronic pen in the surface image displayed in the virtual reality space, and updating the three-dimensional object in the virtual reality space based on the first information; and updating the three-dimensional object in the virtual reality space based on the second information.

13. The rendering method according to claim 12, further comprising:
rendering a tablet terminal image representing a tablet terminal based on a position of the tablet terminal in the virtual reality space,
wherein the surface image displayed in the virtual reality space is defined based on a position of the tablet terminal in the virtual reality space.

14. The rendering method according to claim 13, further comprising:
according to a user operation, selectively displaying the three-dimensional object as the three-dimensional object of three-dimensional displaying in the virtual reality space and displaying the three-dimensional object as the three-dimensional object of two-dimensional displaying in the surface image displayed in the virtual reality space.

15. The rendering method according to claim 13, further comprising:
displaying the electronic pen in the tablet terminal image based on the position of the electronic pen in the virtual reality space indicated by the first information.

16. The rendering method according to claim 12, further comprising:
rendering a display surface image representing a display surface on which two-dimensional displaying of a currently-input three-dimensional object is carried out, and
rendering a tablet surface image representing a tablet surface based on a position of the tablet surface in the virtual reality space.

17. The rendering method according to claim 16, wherein the rendering the display surface image includes rendering the display surface image at a position selected in the virtual reality space or a position in contact with the three-dimensional object in the virtual reality space.

18. The rendering method according to claim 16, wherein the tablet surface is not configured to have a function of detecting a position indicated by the electronic pen.

19. The rendering method according to claim 12, further comprising:
acquiring writing pressure data from a sensing device disposed for the electronic pen in response to a manipulation of the sensing device, and
updating the three-dimensional object based on the writing pressure data acquired.

20. The rendering method according to claim 19, further comprising:
detecting, by the sensing device, a gripping force applied to the electronic pen by the user, wherein the writing pressure data corresponds to the gripping force.

* * * * *